United States Patent
Ikegami

(10) Patent No.: US 9,336,075 B2
(45) Date of Patent: May 10, 2016

(54) MONITORING APPARATUS, MONITORING METHOD, AND STORAGE MEDIUM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 116 days.

(21) Appl. No.: 14/240,822

(22) PCT Filed: May 30, 2012

(86) PCT No.: PCT/JP2012/003548
§ 371 (c)(1),
(2), (4) Date: Feb. 25, 2014

(87) PCT Pub. No.: WO2013/031066
PCT Pub. Date: Mar. 7, 2013

(65) Prior Publication Data
US 2014/0195865 A1   Jul. 10, 2014

(30) Foreign Application Priority Data
Aug. 26, 2011   (JP) .................................. 2011-184670

(51) Int. Cl.
*G06F 11/07* (2006.01)
*G06F 11/30* (2006.01)

(52) U.S. Cl.
CPC ........ *G06F 11/0769* (2013.01); *G06F 11/0709* (2013.01); *G06F 11/3055* (2013.01)

(58) Field of Classification Search
CPC . G06F 11/0766; G06F 11/0787; G06F 11/30; G06F 11/3055; G06F 11/0709; G06F 11/0769; G06F 11/0793; G06F 11/0781; G06F 11/3006; G06F 11/3058; G06F 11/3065; G06F 11/3089; G06F 11/324; H04L 41/06
See application file for complete search history.

(56) References Cited

U.S. PATENT DOCUMENTS

| | | | |
|---|---|---|---|
| 6,883,126 B1 * | 4/2005 | Herman et al. | 714/723 |
| 7,475,275 B2 * | 1/2009 | Chafle et al. | 714/4.4 |
| 7,669,074 B2 * | 2/2010 | Chafle et al. | 714/4.1 |
| 8,482,753 B2 * | 7/2013 | Urasawa | 358/1.14 |
| 8,793,707 B2 * | 7/2014 | Takaoka et al. | 719/318 |

(Continued)

FOREIGN PATENT DOCUMENTS

| | | |
|---|---|---|
| JP | 11-096043 | 4/1999 |
| JP | 11-161474 | 6/1999 |
| JP | 2001-034552 | 2/2001 |
| JP | 2006-113708 | 4/2006 |

(Continued)

OTHER PUBLICATIONS

International Search Report corresponding to International Application No. PCT/JP2012/003548, Aug. 2, 2012, 2 pages.

*Primary Examiner* — Nadeem Iqbal
(74) *Attorney, Agent, or Firm* — Wilmer Cutler Pickering Hale and Dorr LLP

(57) ABSTRACT

There is provided a monitoring apparatus (1) including: an acquisition unit (10) that acquires failure information indicating that a failure has occurred in any of a plurality of monitoring targets; a notification job determination unit (20) that determines whether or not a predetermined user has to be notified of the failure which is specified by the failure information; and a display unit (40) that displays failure notification information indicating occurrence of the failure when the acquisition unit (10) acquires the failure information, and displays notification job information indicating that there is a job to notify the failure to a predetermined user when the notification job determination unit (20) determines that notification has to be issued.

8 Claims, 19 Drawing Sheets

(56) References Cited

U.S. PATENT DOCUMENTS

2009/0089140 A1* 4/2009 Miyamoto ............... 705/9
2009/0210283 A1* 8/2009 Miyamoto ............... 705/9
2010/0138700 A1* 6/2010 McLellan et al. ........ 714/47

FOREIGN PATENT DOCUMENTS

| JP | 2007-034353 | 2/2007 |
| JP | 2010-128858 | 6/2010 |
| JP | 2010-157143 | 7/2010 |

* cited by examiner

FIG. 2

| MONITORING TARGET ID | NOTIFICATION CONDITION | NOTIFICATION DESTINATION |
|---|---|---|
| 000001 | ALL | MANAGEMENT SUPERVISOR |
| 000001 | AUTO-RECOVERY IS NOT POSSIBLE | SUPERVISORY TECHNICIAN |
| ⋮ | ⋮ | ⋮ |
| 000002 | "AUTO-RECOVERABLE FAILURE" AND "NUMBER OF FAILURES EQUAL TO OR GREATER THAN n" | SUPERVISORY TECHNICIAN |
| 000002 | "AUTO-RECOVERABLE FAILURE" AND "FAILURE OF AUTO-RECOVERY" | SUPERVISORY TECHNICIAN |
| ⋮ | ⋮ | ⋮ |

| MONITORING TARGET ID | NOTIFICATION CONDITION | NOTIFICATION DESTINATION | TIME LIMIT |
|---|---|---|---|
| 000001 | ALL | MANAGEMENT SUPERVISOR | WITHIN 1 HOUR FROM OCCURRENCE OF FAILURE |
| 000001 | AUTO-RECOVERY IS NOT POSSIBLE | SUPERVISORY TECHNICIAN | WITHIN 5 MINUTES FROM OCCURRENCE OF FAILURE |
| ⋮ | ⋮ | ⋮ | ⋮ |
| 000002 | "AUTO-RECOVERABLE FAILURE" AND "NUMBER OF FAILURES EQUAL TO OR GREATER THAN n" | SUPERVISORY TECHNICIAN | WITHIN 24 HOURS FROM OCCURRENCE OF FAILURE |
| 000002 | "AUTO-RECOVERABLE FAILURE" AND "FAILURE OF AUTO-RECOVERY" | SUPERVISORY TECHNICIAN | WITHIN 5 MINUTES FROM OCCURRENCE OF FAILURE |
| ⋮ | ⋮ | ⋮ | ⋮ |

FIG. 15
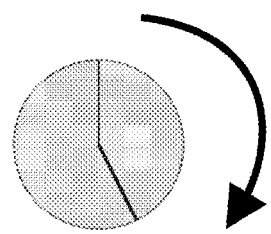
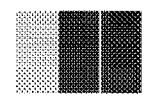
REMAINING TIME 360 sec

FIG. 17

| MONITORING TARGET ID | NOTIFICATION CONDITION | NOTIFICATION DESTINATION | RE-NOTIFICATION CONDITION |
|---|---|---|---|
| 000001 | ALL | MANAGEMENT SUPERVISOR | ABSENCE |
| 000001 | AUTO-RECOVERY IS NOT POSSIBLE | SUPERVISORY TECHNICIAN | 10 MINUTES FROM COMPLETION OF NOTIFICATION |
| ⋮ | ⋮ | ⋮ | ⋮ |
| 000002 | "AUTO-RECOVERABLE FAILURE" AND "NUMBER OF FAILURES EQUAL TO OR GREATER THAN n" | SUPERVISORY TECHNICIAN | 30 MINUTES FROM COMPLETION OF NOTIFICATION |
| 000002 | "AUTO-RECOVERABLE FAILURE" AND "FAILURE OF AUTO-RECOVERY" | SUPERVISORY TECHNICIAN | 10 MINUTES FROM COMPLETION OF NOTIFICATION |
| ⋮ | ⋮ | ⋮ | ⋮ |

US 9,336,075 B2

MONITORING APPARATUS, MONITORING METHOD, AND STORAGE MEDIUM

CROSS-REFERENCE TO RELATED APPLICATIONS

This application is a national stage application of International Application No. PCT/JP2012/003548 entitled "Monitoring Apparatus, Monitoring Method, and Program," filed on May 30, 2012, which claims the benefit of the priority of Japanese patent application No. 2011-184670, filed on Aug. 26, 2011, the disclosures of each of which are hereby incorporated by reference in their entirety.

TECHNICAL FIELD

The present invention relates to a monitoring apparatus, a monitoring method, and a program.

BACKGROUND ART

Recently, there have been provided IT devices such as a server, a storage, and a network device and various methods for monitoring conditions (an activation condition and the like) of various services (hereinafter, referred to as "IT services") implemented by using the IT devices.

For example, a system for monitoring (hereinafter, referred to as a "monitoring system") acquires information (a monitoring message and the like) indicating conditions of monitoring targets (IT services, IT devices, and the like) in real time, and outputs the information through a display or the like. In addition, there is a method of monitoring the information by a monitoring operator. In addition, the information, which indicates the monitoring target conditions, includes information which indicates that a failure has occurred in the monitoring target, and test results of various test items (a response time period, a CPU usage rate, and the like) performed with predetermined time intervals in order to confirm the activation condition of the monitoring target.

Patent Document 1 discloses an operation monitoring center that monitors operations of various network devices, such as a router and a server, and server devices as monitoring target devices, detects abnormality, and performs services such as notification to a customer, handling, and failure recovery of the devices.

Patent Document 2 discloses a failure information providing system including: a notification destination information storage unit that stores data on a user identifier and a contact destination of an operator belonging to a group to be notified in response to a failure message; a failure information storage unit that stores failure information in which a notification identifier is associated with the failure message; an authentication information storage unit that stores first and second access codes for each of the user identifier and the notification identifier; and a control unit that communicates with a user terminal of the operator.

RELATED DOCUMENT

Patent Document

[Patent Document 1] Japanese Unexamined Patent Publication No. 2007-34353
[Patent Document 2] Japanese Unexamined Patent Publication No. 2010-128858

DISCLOSURE OF THE INVENTION

When a failure occurs in a monitoring target, sometimes a monitoring operator, who monitors a monitoring target condition, may have to notify a predetermined user, such as a supervisory technician or a management supervisor, of the failure.

For example, a designer of an IT service system is generally different from the monitoring operator. Therefore, in most cases, the monitoring operator does not completely know the IT service system. For this reason, when a failure occurring in the IT service is an event which is predicted, the monitoring operator deals with the failure in a predetermined manner according to a manual. In contrast, when there is unpredictable trouble, the operator notifies a predetermined user such as a technician of the trouble.

Conventionally, the monitoring operator detects occurrence of a job to notify the predetermined user, on the basis of the information, which indicates occurrence of the failure, within the information which is being monitored. In such a case, the following problems may arise.

There may not necessarily be a one-to-one correspondence between the occurrence of the failure and a notification job. That is, when a failure occurs, the notification job may not occur. For example, in such cases where an auto-recovery function is provided in the monitoring target which is in failure and failure can be recovered from through a process according to the manual, even when a failure occurs, sometimes the notification job may not occur.

Hence, in a case of means for detecting the notification job to notify a predetermined user on the basis of the information which indicates occurrence of the failure, after detection of the information which indicates the occurrence of the failure, until detection of the occurrence of the notification job, it is necessary for the monitoring operator to perform a plurality of steps of (1) recognizing a monitoring target in which a failure occurs, (2) recognizing contents of the failure, and (3) determining whether or not to issue notification in accordance with the recognized contents. That is, the monitoring operator is unable to promptly detect the notification job.

Further, the failure is not immediately recovered from in response to the notification. Hence, after notification completion, during a predetermined time period, the information, which indicates the occurrence of the failure, may be continuously displayed on a screen which is being monitored. In such a case, there is a concern that the monitoring operator is confused as to whether the failure being displayed has been notified. When multiple monitoring targets are concurrently monitored, such a problem becomes significant.

Further, even in the case of the failure recovered from by the auto-recovery function, when the failure occurs again and again, it may be preferable to notify the predetermined user. However, when the failure is recovered from by the auto-recovery function and the information which indicates the occurrence of the failure is cleared on the screen being monitored, there is a concern that the monitoring operator may forget the notification job.

Accordingly, in view of the above problems, an object of the present invention is to provide means for providing new information to the monitoring operator.

According to an aspect of the present invention, there is provided a monitoring apparatus including: an acquisition unit that acquires failure information indicating that a failure has occurred in any of a plurality of monitoring targets; a notification job determination unit that determines whether or not a predetermined user has to be notified of the failure which is specified by the failure information; and a display unit that displays failure notification information indicating occurrence of the failure when the acquisition unit acquires the failure information, and displays notification job information indicating that there is a job to notify the failure to a predetermined user when the notification job determination unit determines that notification has to be issued.

Further, according to another aspect of the present invention, there is provided a program causing a computer to function as: acquisition unit that acquires failure information indicating that a failure has occurred in any of a plurality of monitoring targets; notification job determination unit that determines whether or not a predetermined user has to be notified of the failure which is specified by the failure information; and display unit that displays failure notification information indicating occurrence of the failure when the acquisition unit acquires the failure information, and displays notification job information indicating that there is a job to notify the failure to a predetermined user when the notification job determination unit determines that notification has to be issued.

Further, according to still another aspect of the present invention, there is provided a monitoring method that is executed by a computer, the method including: an acquisition step of acquiring failure information indicating that a failure has occurred in any of a plurality of monitoring targets; a notification job determination step of determining whether or not a predetermined user has to be notified of the failure which is specified by the failure information; and a display step of displaying failure notification information indicating occurrence of the failure when the failure information is acquired in the acquisition step, and displaying notification job information indicating that there is a job to notify the failure to a predetermined user when it is determined that notification has to be issued in the notification job determination step.

In this case, means for providing new information to a monitoring operator is implemented.

BRIEF DESCRIPTION OF THE DRAWINGS

The above-mentioned object, and the other objects, the characteristics, and the advantage are further described in detail with reference to preferred embodiments to be described later and the following accompanying drawings.

FIG. 2 is an example of data which is held by the monitoring apparatus according to the present embodiment.

FIG. 12 is an example of data which is held by the monitoring apparatus according to the present embodiment.

FIG. 15 is an example of contents displayed by the monitoring apparatus according to the present embodiment.

FIG. 17 is an example of data which is held by the monitoring apparatus according to the present embodiment.

DESCRIPTION OF EMBODIMENTS

Hereinafter, an embodiment of the present invention will be described with reference to drawings.

An apparatus according to the present embodiment is implemented by arbitrary combination of hardware and software mainly including: a CPU of an arbitrary computer; a memory; a program (including not only a program, which is stored in advance in a memory when the apparatus is shipped, but also programs downloaded from a server on the Internet and on a storage medium such as a CD) loaded on the memory; a storage unit such as a hard disk storing the program; and an interface for network connection. In addition, it should be understood by those skilled in the art that various modification examples of the implementation method and the apparatus may be made.

Further, the functional block diagrams used to describe the present embodiment are not configurations of hardware units but show blocks of functional units. In the descriptions of the drawings, each apparatus is implemented by a single device, but the implementation means is not limited to this. That is, the implementation means may be formed of physically separate components or logically separate components.

First Embodiment

First, a brief overview of the present embodiment will be described.

The monitoring apparatus according to the present embodiment concurrently monitors a plurality of monitoring targets, and when a failure occurs in the monitoring targets, the apparatus acquires information which indicates occurrence of the failure. Then, the monitoring apparatus displays failure notification information, which indicates the occurrence of the failure, on a display. Further, the monitoring apparatus determines whether or not a predetermined user has to be notified of the failure. Then, when determining that notification has to be issued, the monitoring apparatus displays notification job information, which indicates that a job to notify the predetermined user of the failure has occurred, on the display.

That is, the monitoring apparatus displays the notification job information, which indicates that the job to notify the predetermined user of the failure has occurred, on the display, separately from the failure notification information which indicates the occurrence of the failure.

According to such a monitoring apparatus, the monitoring operator is able to promptly detect occurrence of the notification job to notify the predetermined user, on the basis of the notification job information.

Figure 1:
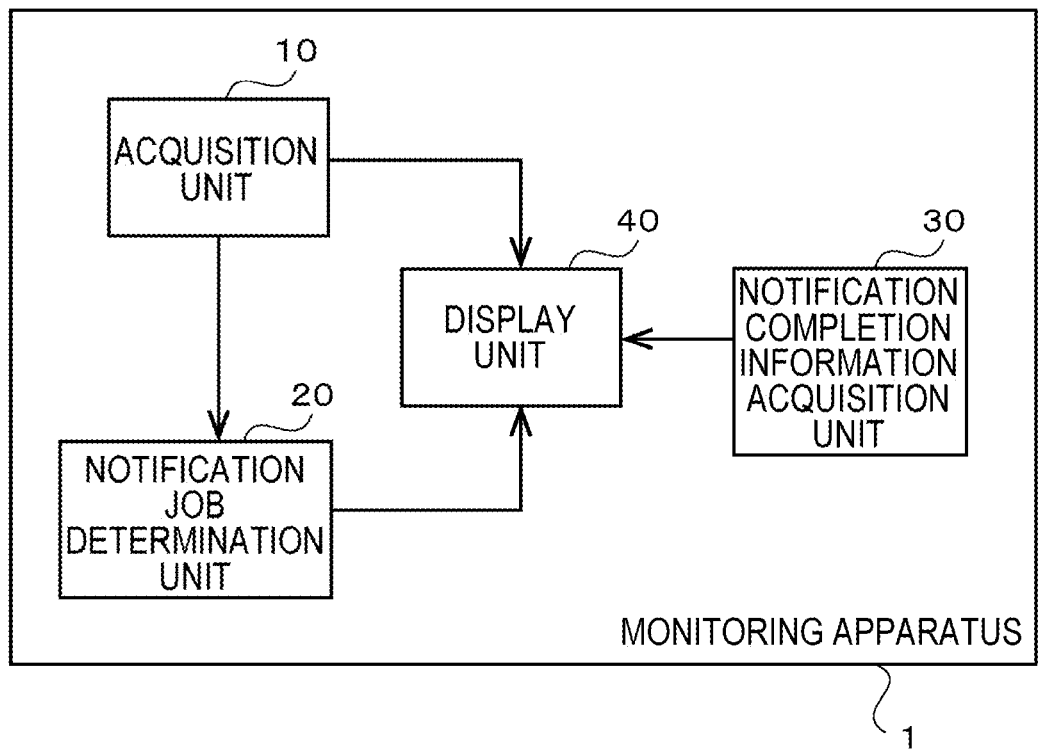
FIG. 1 is an example of a functional block diagram of a monitoring apparatus according to the present embodiment.

Hereinafter, a detailed configuration of the monitoring apparatus according to the present embodiment will be described. FIG. 1 is an example of a functional block diagram of a monitoring apparatus 1 according to the present embodiment.

As shown in FIG. 1, the monitoring apparatus 1 according to the present embodiment has an acquisition unit 10, a notification job determination unit 20, a notification completion information acquisition unit 30, and a display unit 40.

The acquisition unit 10 acquires failure information which indicates that a failure has occurred in any of a plurality of monitoring targets. Further, the acquisition unit 10 acquires recovery information which indicates that the failure having occurred has been recovered from.

The "monitoring targets" correspond to IT devices and systems such as a server, a storage, and a network device, various IT services implemented by using such IT devices and systems, and the like. It should be noted that the number of monitoring targets, which are concurrently monitored, is a design factor.

In addition, means, by which the acquisition unit 10 acquires the failure information or the recovery information, is implemented by conventional techniques. For example, the acquisition unit 10 is connected to the plurality of monitoring targets through a network. Thus, the acquisition unit 10 may acquire the failure information and the recovery information from the monitoring target in which the failure occurs, or may acquire the failure information and the recovery information from other devices (which may be other monitoring targets) in which the failure of the monitoring target is detected.

The failure information may include information that specifies the monitoring target in which the failure occurs, the time at which the failure occurs, contents of the failure, a history such as the cumulative number of occurrences of the failure, and the like. Further, the recovery information may include information that specifies the monitoring target which recovers from the failure, and information such as contents of handling with each failure when the failure is recovered from.

The notification job determination unit 20 determines whether or not a predetermined user has to be notified of the failure specified by the failure information which is acquired by the acquisition unit 10. The predetermined user may be a person, and may be an organization. The notification job determination unit 20 recognizes the monitoring target, in which the failure occurs, and contents of the failure on the basis of the failure information, and is able to determine whether or not notification has to be issued, in accordance with the recognized contents.

For example, the notification job determination unit 20 holds the notification determination rule shown in FIG. 2. In the notification determination rule shown in the drawing, IDs of the monitoring targets are entered in fields of the "monitoring target ID", conditions of determination of notification are entered in fields of the "notification condition", and information pieces specifying predetermined users who have to be notified are entered in fields of the "notification destination". The notification job determination unit 20 may determine whether or not the predetermined user has to be notified of the failure, on the basis of the failure information and notification determination rule, when the acquisition unit 10 acquires the failure information.

According to the notification determination rule of FIG. 2, when a failure occurs in the monitoring target with the monitoring target ID "000001", the notification job determination unit 20 determines that all failures have to be notified to the "management supervisor". Further, when a failure which cannot be automatically recovered from occurs in the monitoring target with the monitoring target ID "000001", the notification job determination unit 20 determines that the failure has to be notified to the "supervisory technician". For example, the notification job determination unit 20 may hold list data in which types of auto-recoverable failures are listed, and may determine whether or not the failure recognized on the basis of the failure information is entered in the list data. In such a manner, the notification job determination unit 20 may determine whether or not the failure is auto-recoverable. In addition, according to the notification determination rule of FIG. 2, when a failure which cannot be automatically recovered from occurs in the monitoring target with the monitoring target ID "000001", the notification job determination unit 20 determines that the "management supervisor" and the "supervisory technician" have to be notified of the failure. As described above, the notification job determination unit 20 is able to determine that a certain failure has to be notified to the plurality of predetermined users.

Furthermore, according to the notification determination rule of FIG. 2, when an auto-recoverable failure occurs in the monitoring target with the monitoring target ID "000002" and the cumulative number of occurrences of the failure is equal to or greater than n, the notification job determination unit 20 determines that the failure has to be notified to the "supervisory technician". In addition, the configuration thereof may be made such that the cumulative number of occurrences of the failure may be entered in, for example, the failure information, or the notification job determination unit 20 counts the cumulative number of occurrences of each failure for each monitoring target. Further, when the auto-recoverable failure occurs in the monitoring target with the monitoring target ID "000002" and the auto-recovery of the failure fails, the notification job determination unit 20 determines that the failure has to be notified to the "supervisory technician". For example, the notification job determination unit 20 may determine that auto-recovery fails, in a case where the monitoring apparatus 1 does not acquire information which indicates that the failure has been recovered from even when a predetermined time period has elapsed from the time at which the failure has occurred. Alternatively, it may be determined that auto-recovery fails, in a case where the monitoring apparatus 1 acquires information, which indicates that auto-recovery fails, from the monitoring target, in which the failure occurs, or a device (which may be another monitoring target) which is monitoring the monitoring target.

It should be noted that the notification determination rule is just an example, and may be other contents.

The display unit 40 displays failure notification information, which indicates the occurrence of the failure, on the display when the acquisition unit 10 acquires the failure information. Further, the display unit 40 displays the notification job information, which indicates that a job to notify the predetermined user of the failure has occurred, on the display when the notification job determination unit 20 determines that the failure has to be notified. That is, the display unit 40 displays the notification job information, which indicates that the job to notify the predetermined user of the failure has occurred, separately from the failure notification information which indicates the occurrence of the failure.

Figure 3:
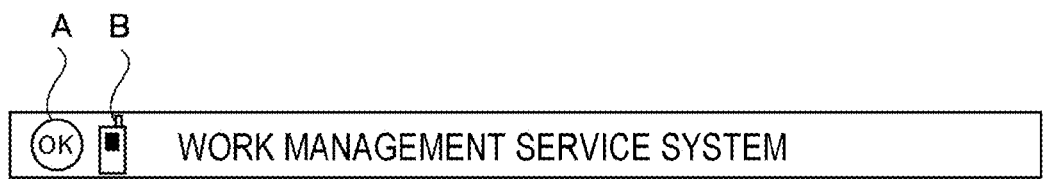
FIG. 3 is an example of contents displayed by the monitoring apparatus according to the present embodiment.
Figure 4:
FIG. 4 is an example of contents displayed by the monitoring apparatus according to the present embodiment.
Figure 5:
FIG. 5 is an example of contents displayed by the monitoring apparatus according to the present embodiment.

It should be noted that contents of the failure notification information and the notification job information are not particularly limited, but examples of the contents are shown in FIGS. 3 to 5.

In this example, first, information, which identifies the monitoring targets with characters, is displayed. In an exemplary case shown in the drawing, it can be seen that the information on the monitoring target "work management service system" is displayed. Then, the icon A indicates whether or not a failure has occurred, and the icon B indicates whether or not a notification job is present.

The icon A shown in FIG. 3 indicates characters of "OK", and the icon B indicates a figure of a "normal mobile phone". This condition indicates that no failure has occurred in the "work management service system" and the notification job is absent. The icon A shown in FIG. 4 indicates a mark of "X", and the icon B indicates a figure of "a mobile phone to which the alert mark is attached". This condition indicates that a failure has occurred in the "work management service system" and the notification job is present. The icon A shown in FIG. 5 indicates the mark of "X", and the icon B indicates the figure of the "normal mobile phone". This condition indicates that a failure has occurred in the "work management service system" but the notification job is absent.

In addition, in the example, in accordance with whether or not the failure occurs and whether or not the notification job is present, display contents of the icons are changed, but otherwise the icons may be displayed only when the failure occurs and the notification job is present.

Figure 10:
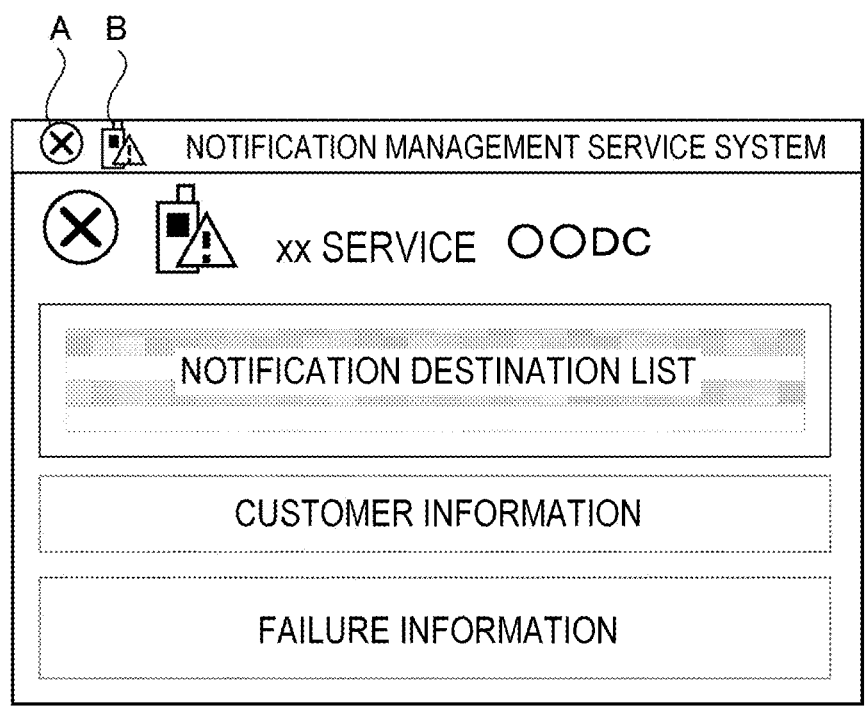
FIG. 10 is an example of contents displayed by the monitoring apparatus according to the present embodiment.

Further, for example as shown in FIG. 10, the information pieces shown in FIGS. 3 to 5 may be displayed on a title bar portion of a window which is displayed on the display, and the information pieces of contents of the failure, predetermined users to be notified, and the like may be displayed on a body text portion of the window. In addition, when the notification job determination unit 20 determines that the failure has to be notified to the plurality of predetermined users, a list of the plurality of predetermined users may be displayed in the field of the notification destination shown in FIG. 10.

Figure 11:
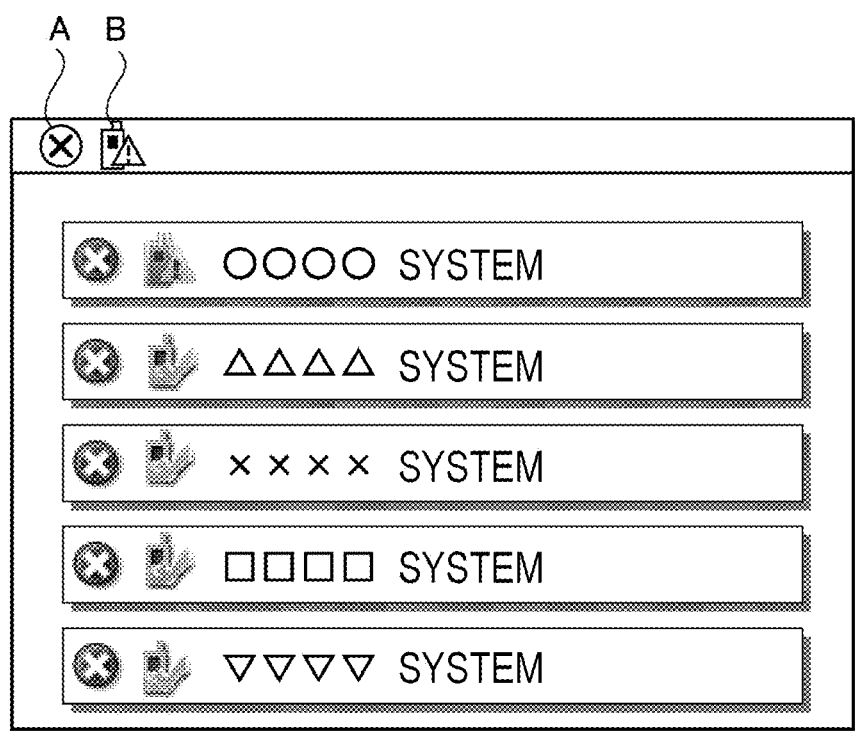
FIG. 11 is an example of contents displayed by the monitoring apparatus according to the present embodiment.

Otherwise, as shown in FIG. 11, the list of the information pieces of the plurality of monitoring targets may be displayed on a single window. When a failure occurs in one of the plurality of monitoring targets shown in the list, the failure notification information is displayed on the title bar portion of the window in such a case. Further, when the notification job for one of the failures which occur is present, the notification job information may be displayed. Then, when an input for selecting one of the plurality of monitoring targets shown in the list is received, the window for the monitoring target shown in FIG. 10 may be displayed.

It should be noted that, for example, the list display shown in FIG. 11 may be a list display in which only the monitoring target in failure is extracted, or may be list display in which only the monitoring target having the notification job is extracted.

Next, the display unit 40 displays the failure notification information, and is thereafter able to end the display of the failure notification information on the failure recovered from when the acquisition unit 10 acquires the recovery information. Here, the sentence "display of the failure notification information is ended" means that the display unit performs display which indicates that no failure has occurred.

Figure 6:
FIG. 6 is an example of contents displayed by the monitoring apparatus according to the present embodiment.

For example, as shown in FIG. 4, in a state where the display unit 40 displays the failure notification information which indicates that a failure has occurred in the "work management service system", when the acquisition unit 10 acquires the recovery information which indicates recovery from the failure, the display unit 40 is able to end the display of the failure notification information as shown in FIG. 6. In the example shown in FIG. 6, the icon A is displayed in the same manner as the display (the display indicating that no failure has occurred) of the icon shown in FIG. 3. In addition, the display unit 40 is able to end the display of the notification job information when a predetermined condition is satisfied, but independently controls each of the end of the display of the failure notification information and the end of the display of the notification job information. Hence, in the example shown in FIG. 6, the display of the failure notification information is ended in response to acquisition of the recovery information, but the display of the notification job information is not ended.

Next, a configuration, in which the display unit 40 ends the display of the notification job information, will be described. The sentence "the display of the notification job information is ended" means that the display unit displays information which indicates that the notification job is absent.

First, the notification completion information acquisition unit 30 shown in FIG. 1 acquires notification completion information which indicates that the notification indicated by the notification job information is completed. The means for causing the notification completion information acquisition unit 30 to acquire the notification completion information is considered as following means.

For example, the notification completion information acquisition unit 30 may receive an input of the information, which indicates that the notification is completed, from a user such as a monitoring operator, and may acquire the information as notification completion information. Alternatively, for example, the monitoring apparatus 1 provides an information transfer function such as a telephone function, a mail transmission function, and a FAX transmission function, and stores, in advance, a contact destination (such as a phone number, a FAX number, and an E-mail address) of the predetermined user notified of the failure. Then, the monitoring apparatus 1 makes a phone call to the contact destination or transmits a mail or a FAX, which includes information on the failure, to the contact destination when accepting selection (click or the like) of the notification job information (icon B) shown in for example FIG. 4. Then, when the phone call is made, the notification completion information acquisition unit 30 may acquire information, which indicates the condition where the phone call is made, as the notification completion information. Further, when the mail or the FAX is transmitted, the notification completion information acquisition unit 30 may acquire information, which indicates transmission completion, as the notification completion information.

The display unit 40 ends the display of the notification job information on the failure of which notification is completed when the notification completion information acquisition unit 30 acquires the notification completion information.

Figure 7:
FIG. 7 is an example of contents displayed by the monitoring apparatus according to the present embodiment.

For example, as shown in FIG. 4, in a state where the display unit 40 displays the notification job information which indicates occurrence of the job to notify the failure occurring in the "work management service system", when the notification completion information acquisition unit 30 acquires the notification completion information which indicates that the notification is completed, the display unit 40 is able to end the display of the notification job information as shown in FIG. 7. In the example shown in FIG. 7, the display of the icon B is changed from the condition shown in FIG. 4, and becomes the display (in the drawing, the figure of the mobile phone to which the check mark is added) which indicates a condition where the notification is completed. Then, the display unit 40 may continuously display the icon, which indicates the condition where the notification shown in FIG. 7 is completed, during a predetermined time period (design factor), and then may change the display to the condition shown in FIG. 5. In FIG. 5, the display (in the drawing, the figure of the mobile phone to which the check mark is added), which indicates the condition where the notification is completed, is changed to the display (the display which indicates that the notification job does has not occurred) the same as the icon shown in FIG. 3. In addition, the display unit 40 may immediately change the condition shown in FIG. 4 to the condition shown in FIG. 5 when the notification completion information acquisition unit 30 acquires the notification completion information.

In addition, when the notification job determination unit 20 determines that the failure has to be notified to the plurality of predetermined users, the notification completion information acquisition unit 30 acquires a plurality of notification completion information pieces each of which indicates that notification to each of the plurality of predetermined users is completed. Then, the display unit 40 may end the display of the notification job information when the notification completion information acquisition unit 30 acquires all the plurality of the notification completion information pieces each of which indicates that notification to each of the plurality of predetermined users is completed. That is, when the notification job determination unit 20 determines that the failure has to be notified to a user A and a user B, the notification completion information acquisition unit 30 acquires both of the notification completion information, which indicates that the notification to the user A is completed, and the notification completion information which indicates that notification to the user B is completed. Then, the display unit 40 ends the display of the notification job information when the notification completion information acquisition unit 30 acquires both of the notification completion information, which indicates that the notification to the user A is completed, and the notification completion information which indicates that notification to the user B is completed.

The monitoring apparatus 1 according to the present embodiment can be implemented by installing, for example, the following program in a computer.

Provided is a program causing a computer to function as:

acquisition means for acquiring failure information indicating that a failure has occurred in any of a plurality of monitoring targets;

notification job determination means for determining whether or not a predetermined user has to be notified of the failure which is specified by the failure information; and display means for displaying failure notification information indicating occurrence of the failure when the acquisition unit acquires the failure information, and displaying notification job information indicating that there is a job to notify the failure to a predetermined user when the notification job determination unit determines that notification has to be issued.

Figure 8:
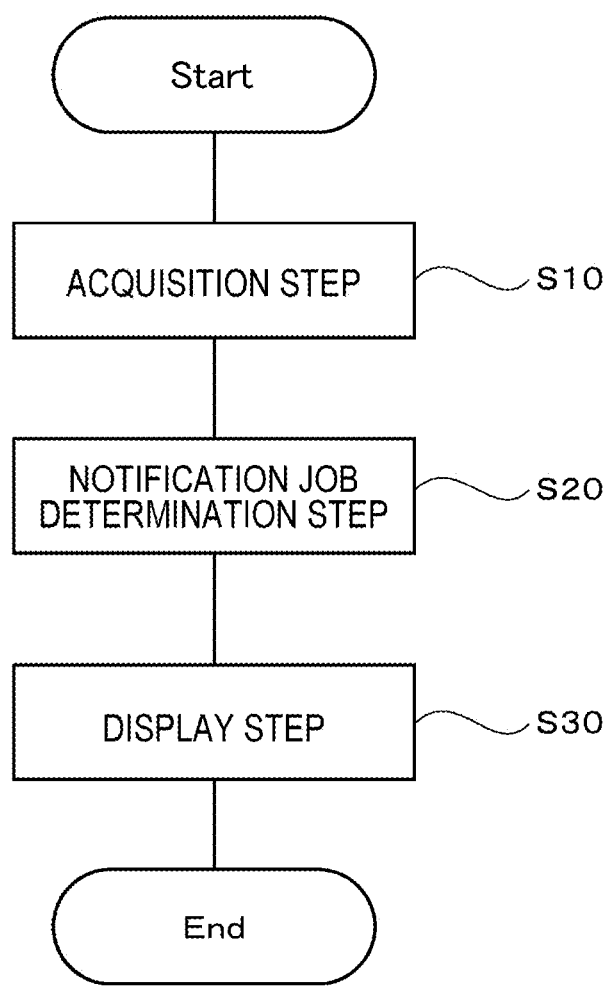
FIG. 8 is a flowchart illustrating an example of a processing flow of a monitoring method according to the present embodiment.

Next, an example of a processing flow of a monitoring method according to the present embodiment will be described with reference to a flowchart of FIG. 8.

First, the display unit 40 displays the information, which is shown in FIG. 3, on the work management service system, which is one of the plurality of monitoring targets, on the display. The information shown in FIG. 3 indicates, as described above, that no failure has occurred in the work management service system and the notification job for the monitoring target is absent. In addition, the monitoring apparatus 1 may additionally display the same information pieces on the other monitoring targets. The plurality of information pieces may be displayed as, for example, a list.

Thereafter, the acquisition unit 10 acquires the failure information which indicates that a failure has occurred in the work management service system (S10: acquisition step). Then, the notification job determination unit 20 determines whether or not the failure has to be notified to the predetermined user (S20: notification job determination step).

Subsequently, the display unit 40 changes the contents of the information shown in FIG. 3, in response to the determination result at S20 (S30).

"Case where Notification Job is Present"

For example, at S20, the notification job determination unit 20 determines that the notification has to be issued. Then, the display unit 40 changes the display of the two icons shown in FIG. 3 to the contents shown in FIG. 4. The information shown in FIG. 4 indicates that a failure has occurred in the work management service system and the notification job is present.

Figure 9:
FIG. 9 is an example of contents displayed by the monitoring apparatus according to the present embodiment.

Thereafter, when the acquisition unit 10 acquires the recovery information on the failure, the display unit 40 changes the contents shown in FIG. 4 to the contents shown in FIG. 6. The information shown in FIG. 6 indicates that no failure has occurred in the work management service system but the notification job is present. Subsequently, when the notification completion information acquisition unit 30 acquires the notification completion information on the failure, the display unit 40 changes the contents shown in FIG. 6 to the contents shown in FIG. 9. The information shown in FIG. 9 indicates that no failure has occurred in the work management service system and the notification is completed (the notification job is absent). The display unit 40 continuously performs the display shown in FIG. 9 during a predetermined time period, and thereafter changes the display to the contents shown in FIG. 3.

Meanwhile, in a state where the contents shown in FIG. 4 are being displayed, when the notification completion information acquisition unit 30 acquires the notification completion information, the display unit 40 changes the contents shown in FIG. 4 to the contents shown in FIG. 7. The information shown in FIG. 7 indicates that a failure has occurred in the work management service system and the notification is completed (the notification job is absent). The display unit 40 continuously performs the display shown in FIG. 7 during a predetermined time period, and thereafter changes the display to the contents shown in FIG. 5. The information shown in FIG. 5 indicates that a failure has occurred in the work management service system but the notification job is absent. Thereafter, when the acquisition unit 10 acquires the recovery information, the display unit 40 changes the contents shown in FIG. 5 to the contents shown in FIG. 3.

"Case where Notification Job is Absent"

Next, at S20, the notification job determination unit 20 determines that the notification is not necessary. Then, the display unit 40 changes only the icon A of the two icons shown in FIG. 3 to the contents shown in FIG. 5. The information shown in FIG. 5 indicates that a failure has occurred in the work management service system but the notification job is absent. Thereafter, when the acquisition unit 10 acquires the recovery information, the display unit 40 changes the contents shown in FIG. 5 to the contents shown in FIG. 3.

In addition, in a state where the contents shown in FIG. 5 are being displayed, even when a predetermined time period has elapsed from a predetermined timing (at which a failure has occurred), the acquisition unit 10 may not acquire the recovery information. In this case, the display unit 40 may change the contents shown in FIG. 5 to the contents shown in FIG. 4. The information shown in FIG. 4 indicates that a failure has occurred in the work management service system and the notification job is present. The subsequent procedure is as described above.

Next, the effects and advantages of the present embodiment will be described.

The monitoring apparatus according to the present embodiment displays the notification job information, which indicates that the job to notify the predetermined user of the failure has occurred, on the display, separately from the failure notification information which indicates the occurrence of the failure.

According to such a monitoring apparatus, the monitoring operator is able to promptly detect occurrence of the notification job to notify the predetermined user, on the basis of the notification job information. That is, a monitoring operator is able to intuitively determine whether or not the notification job is present, without performing steps of detecting the contents of the failure, determining whether or not the failure has to be notified, and the like.

Further, according to the present embodiment, the monitoring operator is able to confirm whether or not the notification has been issued or whether or not the notification job which is not yet executed remains, on the basis of the notification job information. Hence, it is possible to reduce troubles such as redundant notification and a notification being missed.

Second Embodiment

The present embodiment is different from the first embodiment in that information, which indicates the target for the time period during which the notification has to be completed, is displayed together with the notification job information. The other configuration is the same as that of the first embodiment, and thus a description thereof will not be repeated.

The notification job determination unit 20 of the present embodiment determines a time limit at which the notification of the failure which is determined to have to be notified has to be completed. For example, the notification job determination unit 20 holds the notification determination rule shown in FIG. 12. The notification determination rule shown in FIG. 12 is different from the notification determination rule shown in FIG. 2 of the first embodiment in whether or not a field of the "time limit" is present. The other configuration is the same.

In the fields of the "time limit" of the notification determination rule shown in FIG. 12, information pieces for determining the time limits, at which the notification has to be completed, are entered. When acquiring information which is included in the failure information acquired by the acquisition unit 10 and indicates the time at which the failure has occurred, the notification job determination unit 20 may determine the time point, at which the predetermined time period will have elapsed from the time point of occurrence of the failure, by using the information and the notification determination rule shown in FIG. 12.

The display unit 40 displays information, which indicates a notification time limit determined by the notification job determination unit 20, together with the notification job information. Specifically, the display unit 40 is able to display information indicating the time period, which has elapsed from the time point of occurrence of the failure, and/or the time period, which remains until the time limit, in association with each of the notification job information pieces. The contents of the display are not particularly limited, but examples thereof are shown in FIGS. 13 to 15.

Figure 13:
FIG. 13 is an example of contents displayed by the monitoring apparatus according to the present embodiment.

In the example shown in FIG. 13, the bar graph, which extends from the notification job information (icon B), indicates the time period, which has elapsed from the time point of occurrence of the failure, and the time period which remains until the time limit. Specifically, the hatched part of the bar graph indicates the time period which has elapsed from the time point of occurrence of the failure, and the remaining part thereof indicates the time period which remains until the time limit. In addition, as the time period which has elapsed from the time point of occurrence of the failure increases, an area of the hatched part of the bar graph increases, and an area of the remaining part decreases. It should be noted that, although not shown in the drawings, in association with the bar graph, at least one of the time period from the occurrence of the failure to the time limit, the time period which has elapsed from the time point of occurrence of the failure, and, and the time period which remains until the time limit may be displayed as a number. The display unit 40 may change the contents shown in FIG. 13 to the contents shown in FIG. 14 when the notification completion information acquisition unit 30 acquires the notification completion information. In FIG. 14, the view indicates that the notification is completed (the notification job is absent) by changing the display mode of the bar graph.

Figure 14:
FIG. 14 is an example of contents displayed by the monitoring apparatus according to the present embodiment.

It should be noted that, other than the bar graphs shown in FIGS. 13 and 14, the display of the time limit may be represented by a circle shape (clock shape) shown in FIG. 15, may be represented such that the color of the cells gradually change from the corner, or may be represented by text.

Further, in addition to the example shown in FIG. 13, a display, which is for assisting a monitoring operator to recognize that the time period which remains until the time limit becomes short, may be added. As might be expected, the monitoring operator has visual contact with the display of the bar graph shown in FIG. 13 so as to detect ratios of the time period which has elapsed from the time point of occurrence of the failure to the time period which remains until the time limit, and is able to detect a degree of leeway to the time limit. However, the time period from the occurrence of the failure to the time limit is different for each failure, and thus the concept of the time period indicated by the length of the bar graph is different for each failure. For example, the first bar graph indicates the elapsed time period condition of the failure for which the time period from the occurrence of the failure to the time limit is one hour. In addition, the second bar graph indicates the elapsed time period condition of the failure for which the time period from the occurrence of the failure to the time limit is five minutes. In such a case, even when areas of the parts of the first and second graph, each indicating the time period which remains until the time limit, are the same, actually remaining time periods are different. For example, when both the areas of the parts indicating the remaining time periods are equal to one fifth of the total lengths of the bar graphs, the time period, which remains until the time limit of the failure indicated by the first bar graph, is "12 minutes", and the time period, which remains until the time limit of the failure indicated by the second bar graph, is "1 minute".

Figure 19:
FIG. 19 is an example of contents displayed by the monitoring apparatus according to the present embodiment.

Therefore, the display unit 40 may notify the remaining time period to the monitoring operator through, for example, the display shown in FIG. 19. FIG. 19 shows bar graphs each of which extends from the icon B shown in FIG. 13. In the drawing, in addition to the gar graph shown in FIG. 13, the mark C indicating the remaining time period is displayed. The mark C moves from the left end toward the right end in the bar graph, and reaches the right end. Then, it returns to the left end again, and moves from the left end toward the right end in the bar graph. The mark C repeats such an operation. In addition, the moving speed of the mark C is changed in accordance with the time period which remains until the time limit. For example, as the time period remaining until the time limit decreases, the moving speed of the mark C increases. As a specific example, the time period which remains until the time limit is divided into a plurality of levels, and the moving speeds thereof may be set in advance. Examples of the levels include: "the time period to the time limit equal to or greater than 30 minutes"; "the time period to the time limit equal to or greater than 10 minutes and less than 30 minutes"; "the time period to the time limit equal to or greater than 3 and less than 10 minutes"; "the time period to the time limit equal to or greater than 1 and less than 3 minutes"; "the time period to the time limit less than 1 minute"; and the like. Due to the display, the monitoring operator is able to detect the remaining time period, on the basis of the speed of the moving speed of the mark C.

It should be noted that the mark C is not limited to the bars shown in FIG. 19, and may employ another mark. For example, a mark having a shape of a circle, a triangle, a quadrangle, or the like may move in the bar graph. Additionally, the locus in which the mark C moves is not limited to the inside of the bar graph. For example, the mark C may move in the outer periphery of the bar graph, and may move along the bar graph in a locus separated from the bar graph. Additionally, as means for notifying the remaining time period to the monitoring operator, not only the means using the moving speed of the mark C, but also the means using the speed of flickering of the mark C, the graph, or the background may be used to notify the remaining time period.

Further, on the basis of the above-mentioned moving speed of the mark C, or the speed of flickering of the mark C or the like, the target for the remaining time period may not be notified, and the difference between the time periods from the occurrences of the failures to the time limits indicated by the bar graphs may be notified. For example, the shorter the time period from the occurrence of the failure to the time limit is set, the faster the moving speed of the mark C may be set, or the faster the speed of flickering of the mark C or the like may be set. In such a manner, the monitoring operator is able to detect the difference between the time periods from the occurrences of the failures to the time limits indicated by the bar graphs, on the basis of the information.

According to the present embodiment, it is possible to realize the effects and advantages the same as those of the first embodiment.

Further, the monitoring operator is able to easily detect the time limit of the notification job. In such a case, it is possible to reduce trouble that the notification is issued at timing later than a predetermined time limit. Further, the monitoring operator is able to determine the priority order of the notification processes, on the basis of the displayed time limit, when a plurality of notification jobs occurs.

Third Embodiment

The present embodiment is different from the first and second embodiments in the following point. After the notification to the predetermined user is completed, even when the predetermined time period has elapsed, the failure of the notification may not be recovered from. In this case, it is determined to issue the notification to the predetermined user again, and the notification job information is displayed. The other configuration is the same as those of the first and second embodiments, and thus a description thereof will not be repeated.

Figure 16:
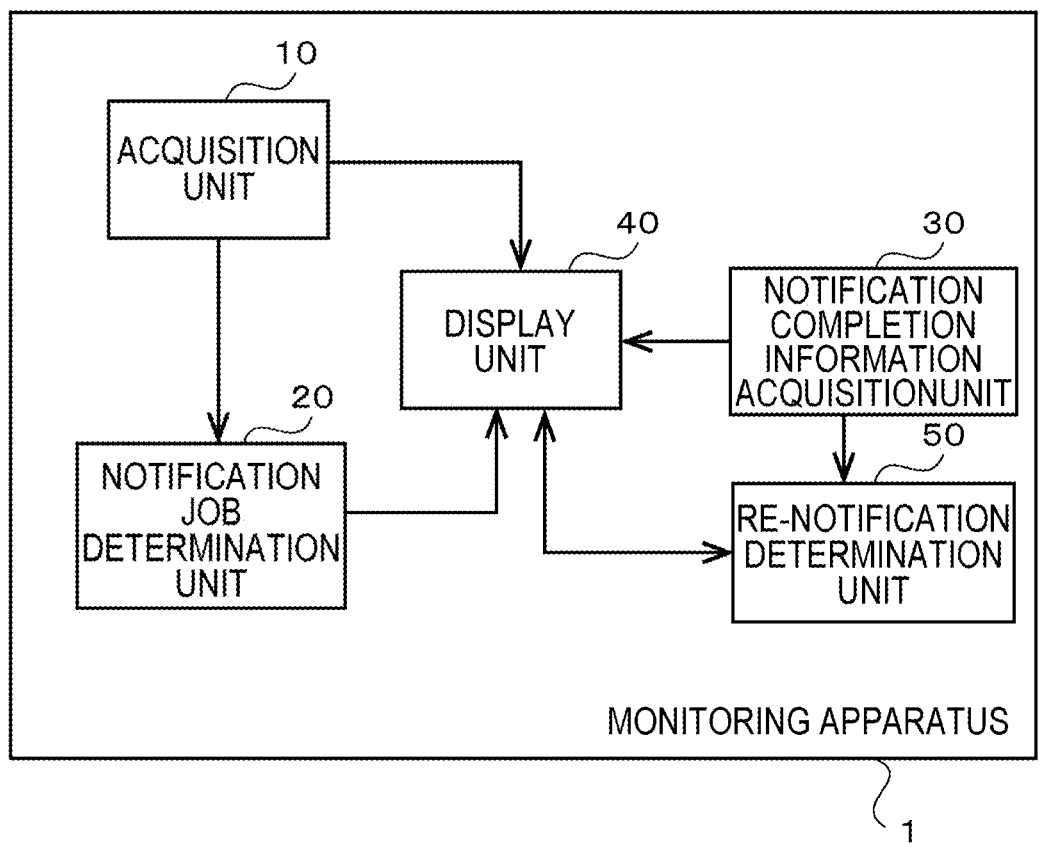
FIG. 16 is an example of a functional block diagram of a monitoring apparatus according to the present embodiment.

FIG. 16 is an example of a functional block diagram of the monitoring apparatus 1 according to the present embodiment.

As shown in FIG. 16, the monitoring apparatus 1 according to the present embodiment has the acquisition unit 10, the notification job determination unit 20, the notification completion information acquisition unit 30, the display unit 40, and a re-notification determination unit 50. The configurations of the acquisition unit 10, the notification job determination unit 20, and the notification completion information acquisition unit 30 are the same as those of the first and second embodiments, and thus a description thereof will not be repeated.

The re-notification determination unit 50 determines that the notification has to be reissued to the predetermined user, when the display of the failure notification information on the first failure is not ended (when the first failure is not recovered from), even though a predetermined time period (design factor) has elapsed after the display of the notification job information on a certain failure (first failure) is ended (after the notification is completed). It should be noted that the "first failure" described herein means a single failure which is specified by the monitoring target in which the failure occurs, the type of the failure, and the time at which the failure occurs.

For example, the re-notification determination unit 50 is configured to be able to use the notification determination rule shown in FIG. 17. The notification determination rule shown in FIG. 17 is different from the notification determination rule shown in FIG. 2 of the first embodiment in whether or not a field of the "re-notification condition" is present. The other configuration is the same.

In the fields of the "re-notification condition" of the notification determination rule shown in FIG. 17, conditions, in which it is determined that the failure has to be notified again, are entered. According to the rule, for example, when a failure which cannot be automatically recovered from occurs in the monitoring target with the monitoring target ID "000001", it is determined that the failure has to be notified to the "supervisory technician". In addition, when the failure has not been recovered from even though 10 minutes have elapsed from the notification completion, it is determined that the notification has to be issued to the "supervisory technician" again. In addition, when the re-notification is not necessary, the field of the re-notification condition is "absence". For example, it is determined that all the failures, which occur in the monitoring target with the monitoring target ID "000001", have to be notified to the "management supervisor". In addition, it is determined that the failure is notified to the management supervisor again.

The display unit 40 displays the notification job information, which indicates that the failure has to be notified, when the re-notification determination unit 50 determines that the notification has to be issued again.

Figure 18:
FIG. 18 is an example of contents displayed by the monitoring apparatus according to the present embodiment.

It should be noted that, after the display unit 40 ends the display of the notification job information in response to the completion of the notification, as shown in FIG. 18, the information, which indicates the target for the time period, may be displayed until the notification job information is displayed again. In the example shown in FIG. 18, the bar graph, which extends from the information (icon B) indicating that the notification job is completed, indicates the time period, which has elapsed from the time point of the notification completion (the time point at which the display of the notification job information is ended), and the time period which remains until the notification job information is displayed again. The display method thereof is the same as that of the bar graph indicating the time period, which has elapsed from the time point of occurrence of the failure, and the time period, which remains until the time limit, as described in the second embodiment. It should be noted that, other than the bar graph shown in FIG. 18, the display of the time period may be represented by a circle shape (clock shape) shown in FIG. 15, may be represented such that the color of the cells gradually change from the corner, or may be represented by text. Further, also in the bar graph, by employing the above-mentioned means shown in FIG. 19, the monitoring operator may be notified of the difference between the target for the time period, which remains until the notification job information is displayed again, and the time period from the time point of the notification completion indicated by each bar graph until the notification job information is displayed again.

According to the present embodiment, it is possible to realize the effects and advantages the same as those of the first and second embodiments.

Further, when the failure is recovered from even though the predetermined time period has elapsed after the notification is completed, that is, when the failure is present during the predetermined time period, sometimes it may be preferable that the notification have to be reissued to the predetermined user such as a technician. In the case of the present embodiment, in such a situation, the notification job information is displayed again. Therefore, it is not necessary for the monitoring operator to manage the time period from the notification completion by themselves, and it can be determined whether or not the notification job is present, on the basis of only the notification job information displayed on the display.

This application claims the benefit of priority from the Japanese Patent Application No. 2011-184670 filed on Aug. 26, 2011, and the entire contents of the application are incorporated herein by reference.

The invention claimed is:

1. A monitoring apparatus comprising:
an acquisition unit that acquires failure information indicating that a failure has occurred in any of a plurality of monitoring targets;
a notification job determination unit that determines whether or not a predetermined user has to be notified of the failure which is specified by the failure information; and
a display unit that displays failure notification information indicating occurrence of the failure when the acquisition unit acquires the failure information, and displays notification job information indicating that there is a job to notify the failure to a predetermined user when the notification job determination unit determines that notification has to be issued,
wherein the acquisition unit acquires recovery information indicating that the failure occurring in any of the plurality of monitoring targets has been recovered from,
wherein the apparatus further comprises a notification completion information acquisition unit that acquires notification completion information indicating that the notification indicated by the notification job information is completed, and
wherein the display unit ends the display of the failure notification information on the failure recovered from when the acquisition unit acquires the recovery information, and ends the display of the notification job information on the failure of which notification is completed when the notification completion information acquisition unit acquires the notification completion information.

2. The monitoring apparatus according to claim 1,
wherein the notification job determination unit is able to determine that a plurality of predetermined users has to be notified of the failure,
wherein the notification completion information acquisition unit acquires a plurality of the notification completion information pieces each indicating that notification to each of the plurality of predetermined users is completed, and
wherein the display unit ends the display of the notification job information when the notification completion information acquisition unit acquires all the plurality of the notification completion information pieces each indicating that notification to each of the plurality of predetermined users is completed, in a case of displaying the notification job information on the failure which the plurality of predetermined users has to be notified of.

3. The monitoring apparatus according to claim 1, further comprising
a notification reissue determination unit that determines that notification has to be reissued to the predetermined user, in a case where the display of the failure notification information on first failure is not ended even when a predetermined time period has elapsed, after the display of the notification job information on the first failure is ended,
wherein the display unit displays the notification job information indicating that notification of the first failure has to be issued when the notification reissue determination unit determines that notification has to be reissued.

4. The monitoring apparatus according to claim 3,
wherein the display unit ends the display of the notification job information on the first failure, and thereafter displays information indicating a time period, which has elapsed from the time point of the end, and/or a time period which remains until the notification job information is displayed again.

5. The monitoring apparatus according to claim 1,
wherein the notification job determination unit further determines a time limit by which notification of the failure, for which it is determined that notification has to be issued, has to be completed, and
wherein the display unit displays the time limit in association with each of the notification job information pieces.

6. The monitoring apparatus according to claim 5,
wherein the notification job determination unit determines a time point, at which a predetermined time period has elapsed from a time point of occurrence of the failure, as the time limit, and
wherein the display unit displays information indicating a time period, which has elapsed from a time point of occurrence of each failure, and/or a time period, which remains until the time limit, in association with each of the notification job information pieces.

7. A non-transitory storage medium storing a program causing a computer to function as:
acquisition unit that acquires failure information indicating that a failure has occurred in any of a plurality of monitoring targets;
notification job determination unit that determines whether or not a predetermined user has to be notified of the failure which is specified by the failure information; and
display unit that displays failure notification information indicating occurrence of the failure when the acquisition unit acquires the failure information, and displaying notification job information indicating that there is a job to notify the failure to a predetermined user when the notification job determination unit determines that notification has to be issued,
wherein the acquisition unit acquires recovery information indicating that the failure occurring in any of the plurality of monitoring targets has been recovered from,
wherein the apparatus further comprises a notification completion information acquisition unit that acquires notification completion information indicating that the notification indicated by the notification job information is completed, and
wherein the display unit ends the display of the failure notification information on the failure recovered from when the acquisition unit acquires the recovery information, and ends the display of the notification job information on the failure of which notification is completed when the notification completion information acquisition unit acquires the notification completion information.

8. A monitoring method that is executed by a computer, the method comprising:
- an acquisition step of acquiring failure information indicating that a failure has occurred in any of a plurality of monitoring targets;
- a notification job determination step of determining whether or not a predetermined user has to be notified of the failure which is specified by the failure information; and
- a display step of displaying failure notification information indicating occurrence of the failure when the failure information is acquired in the acquisition step, and displaying notification job information indicating that there is a job to notify the failure to a predetermined user when it is determined that notification has to be issued in the notification job determination step, wherein the acquisition unit acquires recovery information indicating that the failure occurring in any of the plurality of monitoring targets has been recovered from, wherein the apparatus further comprises a notification completion information acquisition unit that acquires notification completion information indicating that the notification indicated by the notification job information is completed, and wherein the display unit ends the display of the failure notification information on the failure recovered from when the acquisition unit acquires the recovery information, and ends the display of the notification job information on the failure of which notification is completed when the notification completion information acquisition unit acquires the notification completion information.

* * * * *